(12) United States Patent
Medalsy et al.

(10) Patent No.: US 11,167,473 B2
(45) Date of Patent: Nov. 9, 2021

(54) SYSTEM FOR ADDITIVE MANUFACTURE

(71) Applicant: NEXA3D INC., Ventura, CA (US)

(72) Inventors: Izhar Medalsy, Ventura, CA (US);
Luciano Tringali, Rome (IT)

(73) Assignee: NEXA3D INC., Ventura, CA (US)

( * ) Notice: Subject to any disclaimer, the term of this patent is extended or adjusted under 35 U.S.C. 154(b) by 91 days.

(21) Appl. No.: 16/745,158

(22) Filed: Jan. 16, 2020

(65) Prior Publication Data

US 2020/0298471 A1    Sep. 24, 2020

Related U.S. Application Data

(60) Provisional application No. 62/820,206, filed on Mar. 18, 2019.

(51) Int. Cl.
| | | |
|---|---|---|
| *B29C 64/129* | (2017.01) | |
| *B29C 64/314* | (2017.01) | |
| *B29C 64/321* | (2017.01) | |
| *B29C 64/255* | (2017.01) | |
| *B29C 64/393* | (2017.01) | |
| *B29C 64/35* | (2017.01) | |
| *B33Y 10/00* | (2015.01) | |
| *B33Y 30/00* | (2015.01) | |
| *B33Y 40/00* | (2020.01) | |
| *B33Y 50/02* | (2015.01) | |

(52) U.S. Cl.
CPC .......... *B29C 64/129* (2017.08); *B29C 64/255* (2017.08); *B29C 64/314* (2017.08); *B29C 64/321* (2017.08); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 5,122,441 A | 6/1992 | Lawton et al. |
| 5,248,249 A | 9/1993 | Yamamoto et al. |
| 5,340,433 A | 8/1994 | Crump |
| 5,426,722 A | 6/1995 | Batchelder |
| 5,491,643 A | 2/1996 | Batchelder |

(Continued)

FOREIGN PATENT DOCUMENTS

| | | |
|---|---|---|
| CN | 107336438 A | 11/2017 |
| CN | 206840705 U | 1/2018 |

(Continued)

OTHER PUBLICATIONS

International Search Report dated May 7, 2020, from the ISA/European Patent Office, for International Application No. PCT/US2020/013895 (filed Jan. 16, 2020), 3 pgs.

(Continued)

*Primary Examiner* — Matthew J Daniels
*Assistant Examiner* — Paul Spiel
(74) *Attorney, Agent, or Firm* — Ascenda Law Group, PC

(57) ABSTRACT

A photo-curable resin is cured in a tank through exposure to radiation when fabricating an object, and the photo-curable resin in the tank is periodically replaced, e.g., according to its temperature, while printing operations are paused, or recirculated during printing.

9 Claims, 5 Drawing Sheets

(56) References Cited

U.S. PATENT DOCUMENTS

| | | |
|---|---|---|
| 5,503,785 A | 4/1996 | Crump et al. |
| 5,587,913 A | 12/1996 | Abrams et al. |
| 5,625,495 A | 4/1997 | Moskovich |
| 5,653,925 A | 8/1997 | Batchelder |
| 5,764,521 A | 6/1998 | Batchelder et al. |
| 5,900,207 A | 5/1999 | Danforth et al. |
| 6,028,410 A | 2/2000 | Leavitt et al. |
| 6,054,077 A | 4/2000 | Comb et al. |
| 6,067,480 A | 5/2000 | Stuffle et al. |
| 6,085,957 A | 7/2000 | Zinniel et al. |
| 6,238,613 B1 | 5/2001 | Batchelder et al. |
| 6,367,791 B1 | 4/2002 | Calderon et al. |
| 6,437,034 B2 | 8/2002 | Lombardi et al. |
| 6,547,995 B1 | 4/2003 | Comb |
| 6,578,596 B1 | 6/2003 | Batchelder et al. |
| 6,629,011 B1 | 9/2003 | Calderon et al. |
| 6,685,866 B2 | 2/2004 | Swanson et al. |
| 6,749,414 B1 | 6/2004 | Hanson et al. |
| 6,790,403 B1 | 9/2004 | Priedeman, Jr. et al. |
| D514,913 S | 2/2006 | Dunn et al. |
| 7,063,285 B1 | 6/2006 | Turley et al. |
| 7,255,821 B2 | 8/2007 | Priedeman, Jr. et al. |
| 7,297,304 B2 | 11/2007 | Swanson et al. |
| 7,534,386 B2 | 5/2009 | Priedeman, Jr. |
| 7,896,209 B2 | 3/2011 | Batchelder et al. |
| 7,897,074 B2 | 3/2011 | Batchelder et al. |
| 7,910,041 B1 | 3/2011 | Priedeman, Jr. |
| 8,014,889 B2 | 9/2011 | Zinniel et al. |
| 8,033,811 B2 | 10/2011 | Swanson et al. |
| D650,787 S | 12/2011 | Taatjes et al. |
| 8,153,182 B2 | 4/2012 | Comb et al. |
| 8,153,183 B2 | 4/2012 | Skubic et al. |
| 8,155,775 B2 | 4/2012 | Batchelder |
| 8,157,202 B2 | 4/2012 | Taatjes et al. |
| D663,191 S | 7/2012 | Taatjes et al. |
| 8,215,371 B2 | 7/2012 | Batchelder |
| 8,221,858 B2 | 7/2012 | Mannella et al. |
| 8,222,908 B2 | 7/2012 | Paul et al. |
| 8,227,540 B2 | 7/2012 | Priedeman et al. |
| 8,245,757 B2 | 8/2012 | Crump et al. |
| 8,287,959 B2 | 10/2012 | Batchelder |
| D673,605 S | 1/2013 | Johnson et al. |
| 8,419,996 B2 | 4/2013 | Swanson et al. |
| D682,490 S | 5/2013 | Goetzke et al. |
| 8,465,111 B2 | 6/2013 | Swanson et al. |
| 8,598,509 B2 | 12/2013 | Batchelder |
| 8,609,204 B2 | 12/2013 | Kritchman |
| 8,636,850 B2 | 1/2014 | Narovlyansky et al. |
| 8,663,533 B2 | 3/2014 | Swanson et al. |
| 8,663,568 B2 | 3/2014 | Bar Nathan et al. |
| 8,815,141 B2 | 8/2014 | Swanson et al. |
| 8,955,558 B2 | 2/2015 | Bosveld et al. |
| 8,961,167 B2 | 2/2015 | Swanson et al. |
| 8,974,715 B2 | 3/2015 | Hopkins et al. |
| 8,986,767 B2 | 3/2015 | Batchelder |
| 9,027,378 B2 | 5/2015 | Crump et al. |
| 9,050,753 B2 | 6/2015 | Rodgers et al. |
| 9,050,788 B2 | 6/2015 | Swanson et al. |
| D734,788 S | 7/2015 | Reches et al. |
| 9,073,263 B2 | 7/2015 | Mannella et al. |
| 9,090,428 B2 | 7/2015 | Batchelder et al. |
| 9,108,360 B2 | 8/2015 | Comb et al. |
| 9,141,015 B2 | 9/2015 | Hanson et al. |
| D741,149 S | 10/2015 | Koop et al. |
| 9,174,388 B2 | 11/2015 | Batchelder et al. |
| 9,174,389 B2 | 11/2015 | Swanson |
| 9,205,601 B2 | 12/2015 | DeSimone et al. |
| 9,205,690 B2 | 12/2015 | Leavitt et al. |
| 9,215,882 B2 | 12/2015 | Zimmerman et al. |
| 9,233,506 B2 | 1/2016 | Leavitt |
| 9,238,329 B2 | 1/2016 | Swanson et al. |
| 9,321,609 B2 | 4/2016 | Koop et al. |
| 9,334,402 B2 | 5/2016 | Napadensky |
| 9,359,499 B2 | 6/2016 | Cemohous |
| 9,399,320 B2 | 7/2016 | Johnson et al. |
| 9,423,756 B2 | 8/2016 | Hanson et al. |
| 9,427,838 B2 | 8/2016 | Comb et al. |
| 9,483,588 B2 | 11/2016 | Nehme et al. |
| 9,511,547 B2 | 12/2016 | Swanson et al. |
| 9,523,934 B2 | 12/2016 | Orrock et al. |
| 9,527,247 B2 | 12/2016 | Dikovsky et al. |
| D777,251 S | 1/2017 | Reches et al. |
| 9,546,270 B2 | 1/2017 | Hirsch et al. |
| 9,550,327 B2 | 1/2017 | Swanson et al. |
| 10,328,634 B2 | 6/2019 | Zitelli et al. |
| 2009/0179355 A1 | 7/2009 | Wicker et al. |
| 2010/0140849 A1 | 6/2010 | Comb et al. |
| 2010/0161105 A1 | 6/2010 | Blake |
| 2011/0117268 A1 | 5/2011 | Batchelder et al. |
| 2012/0258190 A1 | 10/2012 | Batchelder et al. |
| 2013/0186549 A1 | 7/2013 | Comb et al. |
| 2013/0186558 A1 | 7/2013 | Comb et al. |
| 2013/0224423 A1 | 8/2013 | Mikulak et al. |
| 2013/0297063 A1 | 11/2013 | Kritchman et al. |
| 2014/0036455 A1 | 2/2014 | Napadensky |
| 2014/0052288 A1 | 2/2014 | El-Siblani et al. |
| 2014/0127524 A1 | 5/2014 | Batchelder et al. |
| 2014/0141166 A1 | 5/2014 | Rodgers |
| 2014/0265032 A1 | 9/2014 | Teicher et al. |
| 2014/0319716 A1 | 10/2014 | Shtilerman |
| 2014/0339720 A1 | 11/2014 | Menchik et al. |
| 2014/0358273 A1 | 12/2014 | LaBossiere et al. |
| 2015/0001750 A1 | 1/2015 | Kozlak et al. |
| 2015/0024317 A1 | 1/2015 | Orrock et al. |
| 2015/0028523 A1 | 1/2015 | Jaker et al. |
| 2015/0037587 A1 | 2/2015 | Sella |
| 2015/0076739 A1 | 3/2015 | Batchelder |
| 2015/0084239 A1 | 3/2015 | Batchelder et al. |
| 2015/0097053 A1 | 4/2015 | Batchelder et al. |
| 2015/0097307 A1 | 4/2015 | Batchelder et al. |
| 2015/0097308 A1 | 4/2015 | Batchelder et al. |
| 2015/0145171 A1 | 5/2015 | Walker et al. |
| 2015/0145174 A1 | 5/2015 | Comb |
| 2015/0148931 A1 | 5/2015 | Heide |
| 2015/0152217 A1 | 6/2015 | Cemohous et al. |
| 2015/0158691 A1 | 6/2015 | Mannella et al. |
| 2015/0209836 A1 | 7/2015 | Dunn et al. |
| 2015/0210010 A1 | 7/2015 | Napadensky |
| 2015/0224709 A1 | 8/2015 | Napadensky |
| 2015/0224710 A1 | 8/2015 | El-Siblani |
| 2015/0224714 A1 | 8/2015 | Swanson et al. |
| 2015/0224717 A1 | 8/2015 | Kritchman |
| 2015/0251353 A1 | 9/2015 | Rodgers et al. |
| 2015/0251356 A1 | 9/2015 | Batchelder |
| 2015/0252190 A1 | 9/2015 | Rodgers et al. |
| 2015/0259530 A1 | 9/2015 | Rodgers et al. |
| 2015/0266236 A1 | 9/2015 | Farah et al. |
| 2015/0266241 A1 | 9/2015 | Batchelder |
| 2015/0266242 A1 | 9/2015 | Comb et al. |
| 2015/0273582 A1 | 10/2015 | Crump et al. |
| 2015/0273767 A1 | 10/2015 | Batchelder et al. |
| 2015/0352788 A1 | 12/2015 | Livingston et al. |
| 2015/0360417 A1 | 12/2015 | Kritchman et al. |
| 2016/0009027 A1 | 1/2016 | Martin |
| 2016/0023373 A1 | 1/2016 | Demuth et al. |
| 2016/0033756 A1 | 2/2016 | Miller |
| 2016/0039120 A1 | 2/2016 | Dikovsky et al. |
| 2016/0039146 A1 | 2/2016 | Swanson et al. |
| 2016/0039147 A1 | 2/2016 | Crump et al. |
| 2016/0046072 A1 | 2/2016 | Rolland et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0082655 A1 | 3/2016 | Castanon et al. |
| 2016/0107383 A1 | 4/2016 | Dikovsky et al. |
| 2016/0114535 A1 | 4/2016 | Kritchman et al. |
| 2016/0122541 A1 | 5/2016 | Jaker et al. |
| 2016/0129645 A1 | 5/2016 | Wighton et al. |
| 2016/0136890 A1 | 5/2016 | Castanon et al. |
| 2016/0161872 A1 | 6/2016 | Orrock et al. |
| 2016/0167313 A1 | 6/2016 | Swanson et al. |
| 2016/0176120 A1 | 6/2016 | Skubic et al. |
| 2016/0193786 A1 | 7/2016 | Moore et al. |
| 2016/0193791 A1 | 7/2016 | Swanson et al. |

(56) References Cited

U.S. PATENT DOCUMENTS

| | | |
|---|---|---|
| 2016/0200052 A1 | 7/2016 | Moore et al. |
| 2016/0229123 A1 | 8/2016 | Carlson et al. |
| 2016/0236421 A1 | 8/2016 | Mannella et al. |
| 2016/0236899 A1 | 8/2016 | Beery et al. |
| 2016/0250810 A1 | 9/2016 | Lynch August et al. |
| 2016/0251486 A1 | 9/2016 | Cemohous et al. |
| 2016/0257033 A1 | 9/2016 | Jayanti et al. |
| 2016/0263830 A1 | 9/2016 | Batchelder et al. |
| 2016/0263837 A1 | 9/2016 | Goldman et al. |
| 2016/0303793 A1 | 10/2016 | Ermoshkin et al. |
| 2016/0311158 A1 | 10/2016 | DeSimone et al. |
| 2016/0325493 A1 | 11/2016 | DeSimone et al. |
| 2016/0339643 A1 | 11/2016 | Dikovsky et al. |
| 2016/0339646 A1 | 11/2016 | Baecker et al. |
| 2016/0342149 A1 | 11/2016 | Napadensky |
| 2016/0361763 A1 | 12/2016 | Batchelder et al. |
| 2016/0369096 A1 | 12/2016 | Rolland et al. |
| 2016/0375636 A1 | 12/2016 | Rodgers et al. |
| 2016/0378004 A1 | 12/2016 | Martin |
| 2017/0050389 A1 | 2/2017 | Lee |
| 2017/0129167 A1 | 5/2017 | Castanon |
| 2017/0151717 A1 | 6/2017 | Li |
| 2018/0029296 A1 | 2/2018 | Van Esbroeck et al. |
| 2018/0029311 A1* | 2/2018 | Depalma ............... B29C 64/307 |
| 2018/0036941 A1 | 2/2018 | Xu et al. |
| 2018/0200948 A1 | 7/2018 | Kuijpers et al. |
| 2018/0333917 A1 | 11/2018 | Lee et al. |
| 2018/0341184 A1 | 11/2018 | Hundley et al. |
| 2019/0212572 A1 | 7/2019 | Tomioka |
| 2020/0001525 A1* | 1/2020 | Wynne ................... B29C 64/20 |

FOREIGN PATENT DOCUMENTS

| | | |
|---|---|---|
| CN | 108773067 A | 11/2018 |
| JP | 2948893 B2 | 9/1999 |
| WO | WO9937453 A1 | 7/1999 |
| WO | WO9937454 A1 | 7/1999 |
| WO | WO9937456 A1 | 7/1999 |
| WO | WO9937457 A1 | 7/1999 |
| WO | WO9960508 A1 | 11/1999 |
| WO | WO2007005236 A1 | 11/2007 |
| WO | WO2009088420 A1 | 7/2009 |
| WO | WO2009088423 A1 | 7/2009 |
| WO | WO2012140658 A2 | 10/2012 |
| WO | WO2012140658 A3 | 10/2012 |
| WO | WO2014149312 A1 | 9/2014 |
| WO | WO2014186463 A1 | 11/2014 |
| WO | WO2015084422 A1 | 6/2015 |
| WO | 2015/164234 A1 | 10/2015 |
| WO | WO2015145439 A1 | 10/2015 |
| WO | WO2015170330 A1 | 11/2015 |
| WO | WO2015175682 A1 | 11/2015 |
| WO | WO2016009426 A1 | 1/2016 |
| WO | WO2016010946 A1 | 1/2016 |
| WO | WO2016014088 A1 | 1/2016 |
| WO | WO2016014543 A1 | 1/2016 |
| WO | WO2016049642 A1 | 3/2016 |
| WO | WO2016063282 A1 | 4/2016 |
| WO | WO2016081410 A1 | 5/2016 |
| WO | WO2016085965 A1 | 6/2016 |
| WO | WO2016106136 A2 | 6/2016 |
| WO | WO2016106136 A3 | 6/2016 |
| WO | WO2016109550 A1 | 7/2016 |
| WO | WO2016123499 A1 | 8/2016 |
| WO | WO2016123506 A1 | 8/2016 |
| WO | WO2016125170 A1 | 8/2016 |
| WO | WO2016126796 A2 | 8/2016 |
| WO | WO2016126796 A3 | 8/2016 |
| WO | WO2016133759 A1 | 8/2016 |
| WO | WO2016138345 A1 | 9/2016 |
| WO | WO2016140886 A1 | 9/2016 |
| WO | WO2016140891 A1 | 9/2016 |
| WO | WO2016142947 A2 | 9/2016 |
| WO | WO2016142947 A3 | 9/2016 |
| WO | WO2016145050 A1 | 9/2016 |
| WO | WO2016145182 A1 | 9/2016 |
| WO | WO2016149097 A1 | 9/2016 |
| WO | WO2016149104 A1 | 9/2016 |
| WO | WO2016149151 A1 | 9/2016 |
| WO | WO2016151586 A1 | 9/2016 |
| WO | WO2016172784 A1 | 11/2016 |
| WO | WO2016172788 A1 | 11/2016 |
| WO | WO2016172804 A1 | 11/2016 |
| WO | WO2016172805 A1 | 11/2016 |
| WO | WO2016191473 A1 | 12/2016 |
| WO | WO2016199131 A1 | 12/2016 |
| WO | WO2016205690 A1 | 12/2016 |
| WO | WO2017009830 A1 | 1/2017 |
| WO | WO2017009831 A1 | 1/2017 |
| WO | WO2017009832 A1 | 1/2017 |
| WO | WO2017009833 A1 | 1/2017 |
| WO | WO2017056124 A1 | 4/2017 |
| WO | WO2017210298 A1 | 12/2017 |
| WO | WO2017219942 A1 | 12/2017 |
| WO | WO2018006029 A1 | 1/2018 |
| WO | WO2018032531 A1 | 2/2018 |
| WO | WO2019014098 A1 | 1/2019 |

OTHER PUBLICATIONS

Written Opinion dated May 7, 2020, from the ISA/European Patent Office, for International Application No. PCT/US2020/013895 (filed Jan. 16, 2020), 6 pgs.

International Search Report and Written Opinion dated Jul. 7, 2020, from ISA/European Patent Office, for International Patent Application No. PCT/US2020/026342 (filed Apr. 2, 2020), 49 pages.

International Preliminary Report on Patentability dated Jun. 14, 2021, from the IPEA/European Patent Office, for International Patent Application No. PCT/US2020/013895 (filed Jan. 16, 2020), 14 pgs.

Amendment filed Feb. 5, 2021, from U.S. Appl. No. 16/373,449 (filed Apr. 2, 2019), 8 pgs.

Notice of Allowance dated Feb. 17, 2021, from U.S. Appl. No. 16/373,449 (filed Apr. 2, 2019), 8 pgs.

Amendment filed Jan. 25, 2021, from U.S. Appl. No. 16/105,307 (filed Aug. 20, 2018), 12 pgs.

International Preliminary Report on Patentability dated Feb. 17, 2021, for International Patent Application No. PCT/US2020/026342 (filed Apr. 2, 2020), 10 pgs.

Written Opinion of the International Preliminary Examining Authority dated Feb. 16, 2021, from the IPEA/European Patent Office, for International Patent Application No. PCT/US2020/013895 (filed Jan. 16, 2020), 6 pgs.

International Search Report and Written Opinion dated Oct. 12, 2018, from the ISA/EPO, for International Patent Application No. PCT/US2018/041225 (filed Jul. 9, 2018), 14 pages.

International Application No. PCT/US2019/045214; International Search Report and Written Opinion; ISA/EP; dated Nov. 26, 2019; 16 pages.

Medalsy, Izhar, "Methods and Systems for Photo-Curing Photosensitive Material for Printing and Other Applications", U.S. Appl. No. 16/105,307, filed Aug. 20, 2018, 33 pages.

International Preliminary Report on Patentability dated Apr. 1, 2021, from teh IPEA/US, for International Patent Application No. PCT/US2019/045214 (filed Aug. 6, 2019), 13 pgs.

International Preliminary Report on Patentability dated May 20, 2021, from the the International Bureau of WIPO, for International Patent Application No. PCT/US2019/060219 (filed Nov. 7, 2019), 14 pgs.

Non-Final Office Action dated Jan. 7, 2021, from U.S. Appl. No. 16/105,307 (filed Aug. 20, 2018), 14 pgs.

Non-Final Office Action dated Jan. 21, 2021, from U.S. Appl. No. 16/373,449 (filed Apr. 2, 2019), 11 pgs.

International Search Report and Written Opinion dated Jun. 24, 2020, from the ISA/European Patent Office, for International Application No. PCT/US2019/060219 (filed Nov. 7, 2019), 22 pgs.

* cited by examiner

SYSTEM FOR ADDITIVE MANUFACTURE

RELATED APPLICATIONS

This is a NONPROVISIONAL of, claims priority to, and incorporates by reference U.S. Provisional Application No. 62/820,206, filed 18 Mar. 2019.

FIELD OF THE INVENTION

The present invention relates to an additive manufacturing apparatus in which a photo-curable resin is cured through exposure to radiation when fabricating an object, and in particular to such an apparatus in which the photo-curable resin in a vat is periodically replaced according to its temperature.

BACKGROUND

Within the field of additive manufacturing, so-called three-dimensional printing, or 3D printing, by means of photo-curing a viscous, liquid resin (typically a liquid polymer) layer-by-layer to form a desired object has become very popular. Within this field, it is known that the speed of polymerization of the photo-curable resin (e.g., under exposure to UV light) and the quality of the resulting object under fabrication are sensitive to temperature. Because the polymerization process is an exothermic reaction, temperature management is therefore an important consideration in the design of a 3D printer that relies on such fabrication techniques.

SUMMARY OF THE INVENTION

In various embodiments, the present invention provides an additive manufacturing apparatus in which an object is formed in a tank by selective photo-curing of a liquid resin contained in the tank through exposure to radiation. The apparatus is characterized in that the tank has one or more ports for the introduction and evacuation of the liquid resin under the control of one or more pumps, which fluidly couple a resin-containing area of the tank to one or more sources of resin and resin storage. The sources of resin and resin storage may be chilled so that during printing operations cool resin may replace resin in the tank which has become heated beyond a threshold temperature. The resin may be replaced through recirculation during printing, or while printing is paused.

A further embodiment of the invention provides a method of performing an additive manufacturing process in which an object is formed in a tank by selective photo-curing of a liquid resin contained in the tank through exposure to radiation, characterized in that prior to printing operation in the tank, the tank is filled with resin to an operational level by pumping resin from a resin source into the tank via a port in the tank, printing operations are performed, and then paused when a temperature of the resin in the tank reaches or exceeds a threshold. At that time, the resin in the tank is evacuated to a resin storage and new, preferably chilled, resin is pumped into the tank, e.g., via the same or a different port. Alternatively, the resin may be recirculated during printing, avoiding the need to pause printing operations.

These and further embodiments of the invention are described in greater detail below.

DETAILED DESCRIPTION

In the following description of embodiments of the invention, reference is made to the accompanying drawings that form a part hereof, and in which are shown by way of illustration specific embodiments in and by which the invention may be practiced. It should be understood that other embodiments may be realized based on the teachings presented herein without departing from the scope of the present invention. Description associated with any one of the figures may be applied to a different figure containing like or similar components.

Figure 1:
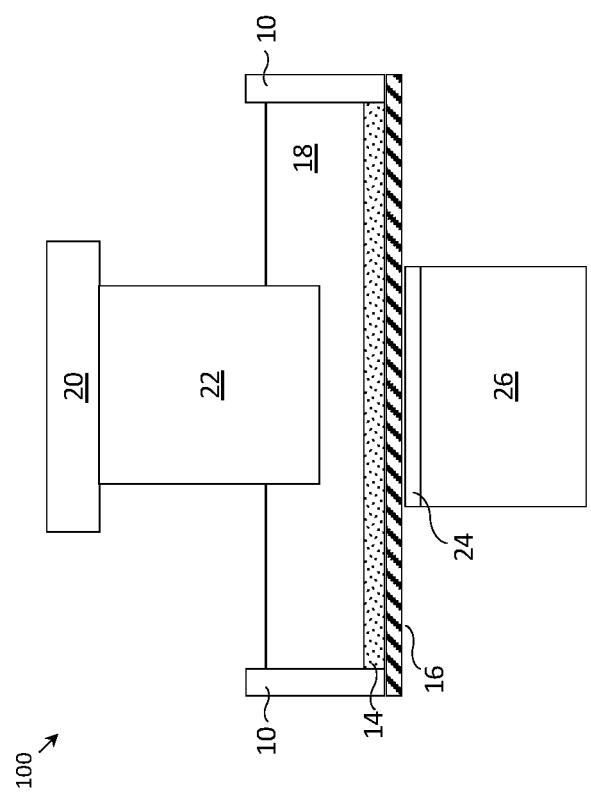
FIG. 1 depicts a schematic cross-section of a 3D printing system in which an object undergoes fabrication in a tank containing a photo-curing liquid resin, in accordance with one embodiment of the invention.

FIG. 1 depicts a cross-section of 3D printing system 100, in which electromagnetic radiation (e.g., ultra-violet ("UV") light) is used to cure a photo-curing liquid resin (typically a liquid polymer) 18 in order to fabricate an object (e.g., a 3D object) 22. Object 22 may be fabricated layer by layer (i.e., a new layer of the object may be formed by photo-curing a layer of liquid polymer 18 adjacent to the bottom surface of the object), and as each new layer is formed the object may be raised by extractor plate 20, allowing a next layer of photo-curing liquid resin 18 to be drawn under the newly formed layer. This process may be repeated multiple times to form additional layers until fabrication of the object is complete.

The 3D printing system 100 may include tank 10 for containing the photo-curing liquid resin 18. The bottom of tank 10 (or at least a portion thereof) is sealed (i.e., to prevent the photo-curing liquid polymer 18 from leaking out of tank 10) by a flexible membrane 14, which is transparent (or nearly so) at wavelengths of interest for curing of the resin to allow electromagnetic radiation from a light source 26 to enter into tank 10. A mask 24 (e.g., a liquid crystal layer) may be disposed between light source 26 and the photo-curing liquid resin 18 to allow the selective curing of the liquid resin (which allows the formation of 3D object into intricate shapes/patterns). In various embodiments, collimation and diffusion elements such as lenses, reflectors, filters, and/or films may be positioned between mask 24 and light source 26. These elements are not shown in the illustrations so as not to unnecessarily obscure the drawings.

One challenge faced by 3D printing systems of the kind illustrated in FIG. 1 is that in addition to adhering to the object, the newly formed layers have a tendency to adhere to the bottom of tank. This is an undesirable situation as a newly formed layer could tear off from the remainder of the object of which it is a part when the extractor plate (and, hence, the object) is raised. To address this issue, the flexible membrane 14 (which may but need not necessarily be a self-lubricating membrane) is disposed at, and in this example forms, the bottom of tank 10 (or at least a portion thereof). The flexible membrane 14 may be formed of silicone or other flexible material, and may, in some instances, be enriched or coated with polytetrafluoroethylene (PTFE) to further increase its "non-stick" quality.

A platen or backing member 16 disposed between the mask 24 and the flexible membrane 14 provides structural support and is also transparent (or nearly so) at the one or more wavelengths of interest for curing the resin. Such a platen may be formed of borosilicate glass or other material. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible membrane 14 is secured to the edges of tank 10 or to a replaceable cartridge assembly (not shown) so as to maintain a liquid-tight perimeter at the edges of the tank or other opening ("liquid-tight" meaning that the tank does not leak during normal use).

Preferably, during printing operations the membrane 14 is maintained under biaxial strain over its longitudinal and transverse extents. By keeping the membrane under biaxial strain, the membrane exhibits a tendency to maintain its shape in a plane defining the bottom of the tank. This is useful because as the extraction plate, and, hence, the object under construction, is raised during the printing process, so too is the membrane deformed in the direction of the rising extraction plate. This is because the polymer resin is very viscous and there is an absence of air (i.e., a vacuum or partial vacuum) between the newly formed layer of the object under construction and the membrane. Consequently, as that newly formed layer rises (as a result of the raising of the extraction plate), the membrane is drawn upwards (i.e., flexes) in an area immediately beneath the newly formed layer. The tension imparted in the membrane, however, causes the membrane to gradually peel away from the newly formed layer of the object and return to its original, planar position. This gradual separation of the membrane and the newly formed layer of the object reduces mechanical stresses on the newly formed polymer layer, thereby reducing the risk of that layer tearing away from the previously formed portions of the object under construction.

When fabricating a layer of object 22 using 3D printing system 100, electromagnetic radiation is emitted from radiation source 26 through mask 24, platen 16, and membrane 14 into tank 10. The electromagnetic radiation may form an image on an image plane adjacent the bottom of object 22. Areas of high (or moderate) intensity within the image may cause curing of localized regions of the photo-curing liquid resin 18. The newly cured layer adheres to the former bottom surface of object 22 and substantially does not adhere to the bottom surface of tank 10 due to the presence of flexible membrane 14. After the newly cured layer has been formed, the emission of electromagnetic radiation may temporarily be suspended (or not, in the case of "continuous printing") while the extraction plate 20 is raised away from the bottom of the tank so that another new layer of object 22 may be printed.

Figure 2:
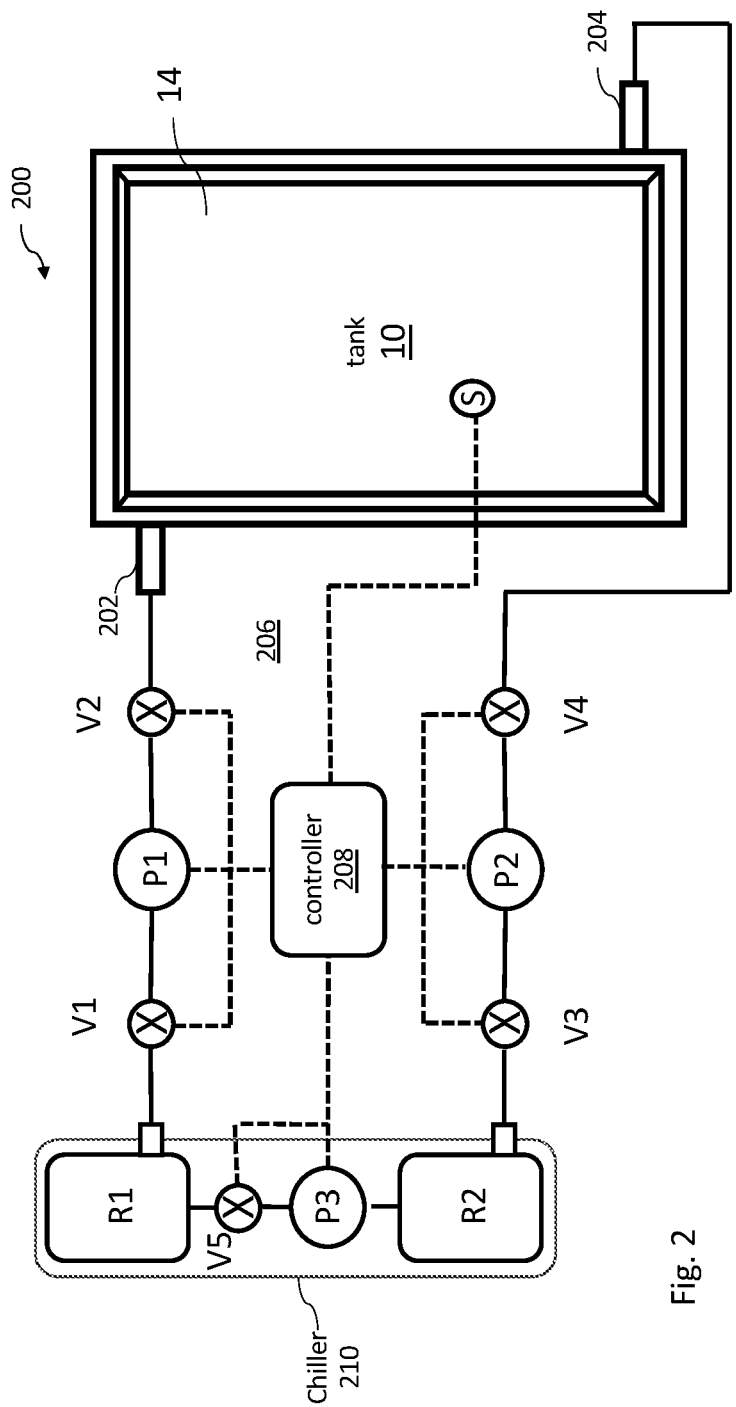
FIG. 2 depicts a schematic view of a resin filling and evacuation arrangement for the 3D printing system shown in FIG. 1, in accordance with one embodiment of the invention.

Referring now to FIG. 2, a schematic view of a resin filling and evacuation arrangement 200 for the 3D printing system shown in FIG. 1 is illustrated. As shown, tank 10 is fitted with two ports, 202, 204. Through a piping arrangement 206, resin from one of reservoirs R1 and R2 is pumped into tank 10 via one of the ports so that printing operations may be performed. More specifically, under the direction of controller 208, valves V1, V2 are opened, valves V3, V4 remain closed, and pump P1 is operated to pump resin from reservoir R1 into tank 10 via port 202 to the tank's operational level. Once the tank is filled with resin to its operational level, controller 208 closes valves V1 and V2 and turns off pump P1. While printing operations take place, controller 208 monitors the temperature of the resin in tank 10 using a temperature sensor S. Additionally, during the printing operations, controller 208 opens valve V5 and operates pump P3 to transfer resin from reservoir R2 into reservoir R1, refilling it.

When the temperature of the resin in tank 10 reaches or exceeds a threshold level, as determined by controller 208 though signals from sensor S, printing operations are paused. The resin in tank 10 is then evacuated via port 204. To do so, controller 208 opens valves V4 and V3 and operates pump P2 to pump resin from tank 10 into reservoir R2. The volume of resin in tank 10 is not great, and pump P2 has a capacity sufficient to evacuate the tank in a few tens of seconds to approximately a minute or two. Once the tank has been evacuated, controller 208 closes valves V3 and V4, turns off pump P2, opens valves V1 and V2, and refills the tank with resin by operating pump P1 to pump resin into the tank from reservoir R1. Printing operations are then resumed. This process may be repeated as many times as necessary until the object under fabrication has been completed. If needed, resin can be evacuated from a reservoir via a drain (not shown) and replaced, e.g., if it has become contaminated during the printing process or the photoinitiators in the resin depleted.

Reservoirs R1 and R2 are kept chilled using a chiller unit 210. For example, the reservoirs may be refrigerated units, or may be enclosed in a refrigerated housing or chilled wraps. In some instances, reservoirs R1 and R2 may be separate chambers of a single unit, or may be different units, as shown. The two reservoirs may be chilled by separate refrigeration means, or by the same one.

By keeping a source of chilled resin available for tank 10 in reservoir R1, when the temperature of the working resin in tank 10 reaches or exceeds a defined threshold, the resin can be replaced. By maintaining the working resin in the tank relatively cool, overall printing speeds can be kept relatively fast because it is no longer necessary to allow the resin in the tank to cool down when it gets too hot for acceptable printing. While air cooling of the resin in the tank during printing operations may be done, the resin replacement operation of the present invention has been observed to provide better results in terms of overall printing speed.

Optimal operating temperatures for the resin will vary according to the kind of resin used, the object being fabricated, the printing speed, and possibly other factors. Accordingly, controller 208 may allow an operator to specify parameters such as resin type and design constraints that will affect the temperature, or temperature range at which resin replacement operations such as those described above may take place. Or, the controller 208 may allow for an operator to specify the temperature threshold or threshold range.

In the illustrated embodiment, the tank is fitted with a pair of ports 202, 204 (disposed opposite one another in terms of the tank's length and breadth) for the introduction and evacuation of resin, however, in other embodiments both could be performed through a single port. Also, while two reservoirs are illustrated, more than two, with appropriate piping arrangements, could be used. Indeed, it is possible to use a single reservoir with multiple chambers, each chamber being selectively accessed for introduction of resin into the tank and/or receipt of resin from the tank.

Further, while the method described above has resin always being introduced into the tank from reservoir R1 and evacuated to reservoir R2, the reverse or other flow arrangement may be used. For example, resin may initially be provided to the tank from reservoir R1, later evacuated thereto when the resin replacement temperature has been reached or exceeded, the tank refilled from reservoir R2, and again evacuated thereto when the resin replacement temperature has been reached or exceeded, and this reciprocating process repeated as needed.

Further embodiments of the invention provide for less than complete evacuation of resin from the tank. For example, in some instances a portion of the resin from the tank may be pumped out to one of the carboys when the resin in the tank has reached or exceeded the threshold temperature. The tank may then be refilled. The refilling may be with resin from the other tank, or with resin from the same carboy into which the heated resin was pumped from the tank. Recall that the carboys are chilled, hence, resin in the carboys is kept relatively cool. If heated resin from the tank is pumped into a carboy that contains cooled resin, the effect will be to cool the heated resin from the tank. This mixture will be at a temperature lower than the resin evacuated from the tank and therefore suitable to be reintroduced into the tank. The same procedure may be used even if the tank is completely evacuated of resin.

In some cases, the tank may be fitted with ports to allow only the heated resin to be evacuated. The photo-curing reaction is exothermic, but the resin is very viscous. As a result, the heated resin will tend to be present mostly in an area adjacent the object being formed. By placing a port or drain near this vicinity of the tank, the heated resin may be evacuated by the pumps, leaving relatively cooler resin in the tank (if the tank is not fully evacuated). Depending on the tank volume, the remaining resin in the tank may be sufficient to continue build operations while the heated resin is being cooled, either by being chilled in a carboy or by mixing with cooler resin already present therein. Chilled resin may be introduced into the tank either as needed or each time resin is evacuated. This process may continue in a cyclical fashion with heated resin being evacuated and chilled resin being reintroduced until build operations have ceased.

Figure 3:
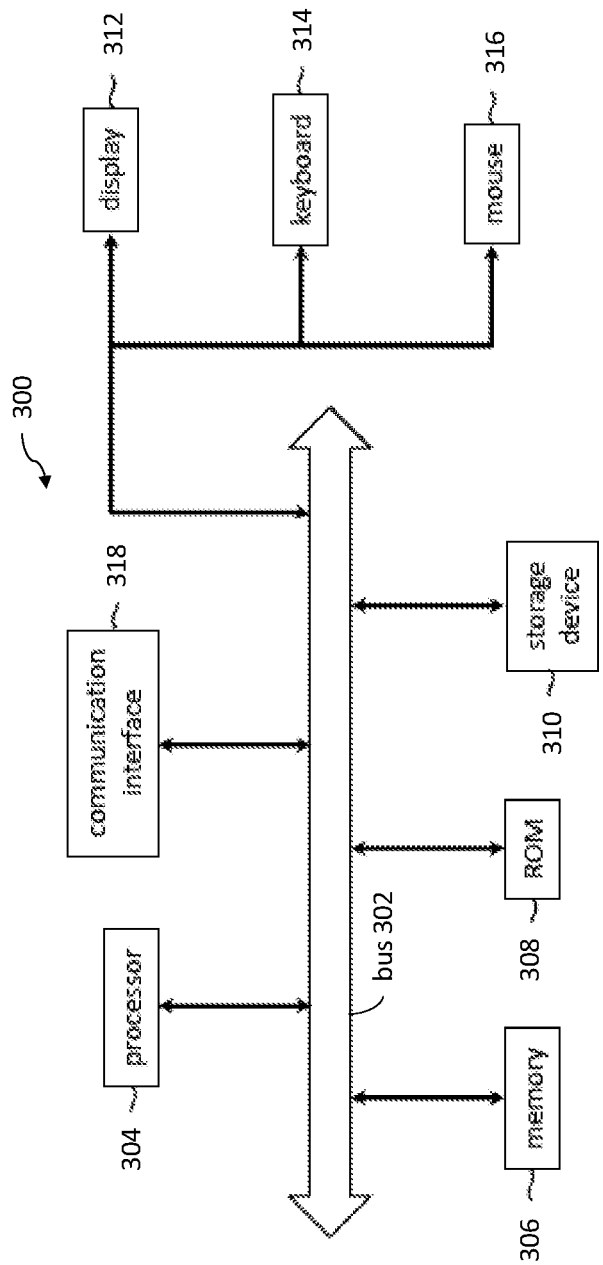
FIG. 3 depicts an example of a controller for the resin filling and evacuation arrangement illustrated in FIG. 2, in accordance with one embodiment of the invention.

As is apparent from the foregoing discussion, aspects of the present invention involve the use of a controller, which may be implemented as a processor-based system with a processor-readable storage medium having processor-executable instructions stored thereon so that when the processor executes those instructions it performs operations to cause the actions described above. FIG. 3 provides an example of such a controller 300, but not all such controllers need have all of the features of controller 300. For example, certain controllers may not include a display inasmuch as the display function may be provided by a client computer communicatively coupled to the controller or a display function may be unnecessary. Such details are not critical to the present invention.

Controller 300 includes a bus 302 or other communication mechanism for communicating information, and a processor 304 coupled with the bus 302 for processing information. Controller 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Controller 300 further includes a read only memory (ROM) 308 or other static storage device coupled to the bus 302 for storing static information and instructions for the processor 304. A storage device 310, for example a hard disk, flash memory-based storage medium, or other storage medium from which processor 304 can read, is provided and coupled to the bus 302 for storing information and instructions (e.g., operating systems, applications programs and the like).

Controller 300 may be coupled via the bus 302 to a display 312, such as a flat panel display, for displaying information to a computer user. An input device 314, such as a keyboard including alphanumeric and other keys, may be coupled to the bus 302 for communicating information and command selections to the processor 304. Another type of user input device is cursor control device 316, such as a mouse, a trackpad, or similar input device for communicating direction information and command selections to processor 304 and for controlling cursor movement on the display 312. Other user interface devices, such as microphones, speakers, etc. are not shown in detail but may be involved with the receipt of user input and/or presentation of output.

The processes referred to herein may be implemented by processor 304 executing appropriate sequences of computer-readable instructions contained in main memory 306. Such instructions may be read into main memory 306 from another computer-readable medium, such as storage device 310, and execution of the sequences of instructions contained in the main memory 306 causes the processor 304 to perform the associated actions. In alternative embodiments, hard-wired circuitry or firmware-controlled processing units may be used in place of or in combination with processor 304 and its associated computer software instructions to implement the invention. The processor-readable instructions may be rendered in any computer software language.

In general, all of the above process descriptions are meant to encompass any series of logical steps performed in a sequence to accomplish a given purpose, which is the hallmark of any processor-executable application. Unless specifically stated otherwise, it should be appreciated that throughout the description of the present invention, use of terms such as "processing," "computing," "calculating," "determining," "displaying," "receiving," "transmitting," or the like, refer to the action and processes of an appropriately programmed controller, such as controller 300 or similar electronic computing device, that manipulates and transforms data represented as physical (electronic) quantities within its registers and memories into other data similarly represented as physical quantities within its memories or registers or other such information storage, transmission or display devices.

Controller 300 also includes a communication interface 318 coupled to the bus 302. Communication interface 318 may provide a two-way data communication channel with a computer network, which provides connectivity to and among the various computer systems discussed above. For example, communication interface 318 may be a local area network (LAN) card to provide a data communication connection to a compatible LAN, which itself is communicatively coupled to the Internet through one or more Internet service provider networks. The precise details of such communication paths are not critical to the present invention. What is important is that controller 300 can send and receive messages and data through the communication interface 318 and in that way communicate with hosts accessible via the Internet. It is noted that the components of controller 300 may be located in a single device or located in a plurality of physically and/or geographically distributed devices.

Figure 4A:
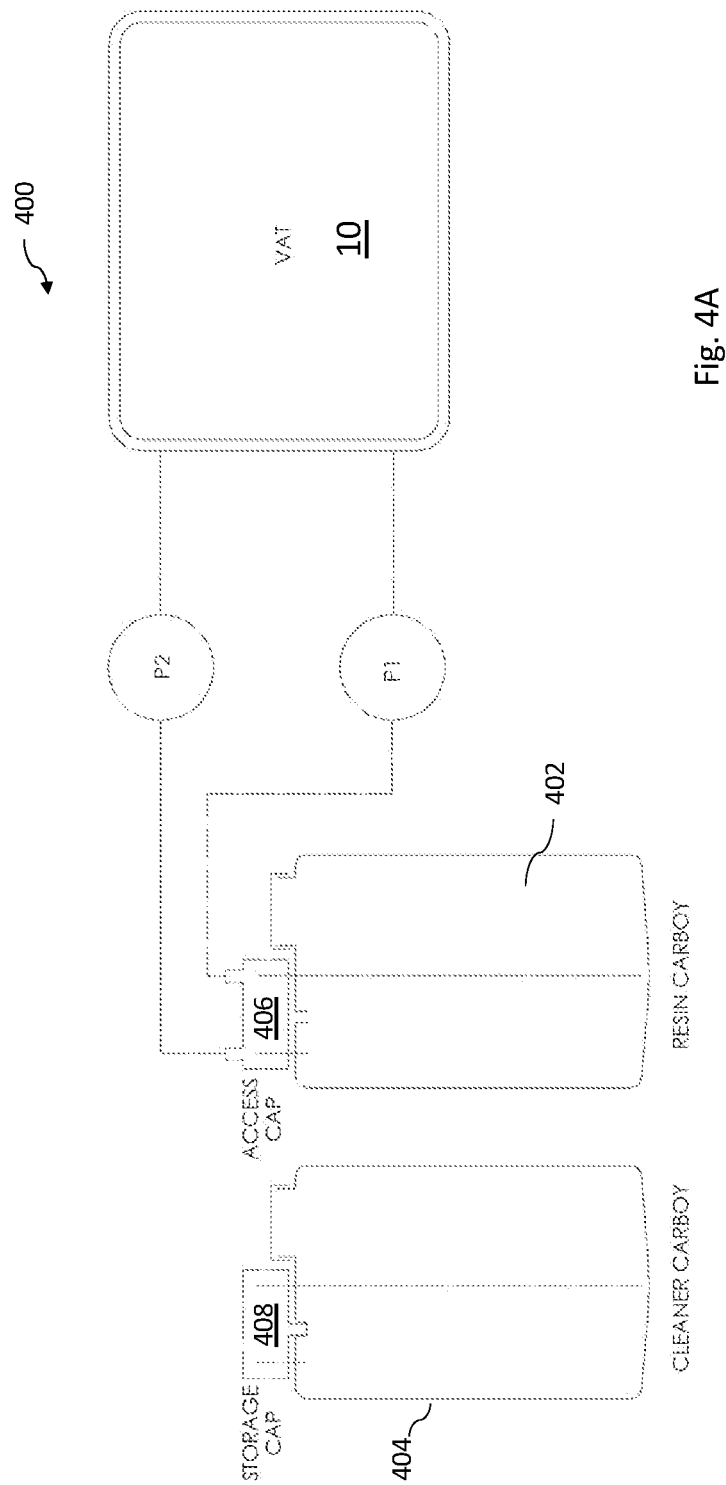
FIGS. 4A and 4B illustrate an alternative embodiment of a resin filling and evacuation arrangement for the 3D printing system shown in FIG. 1, in accordance with an embodiment of the invention.
Figure 4B:
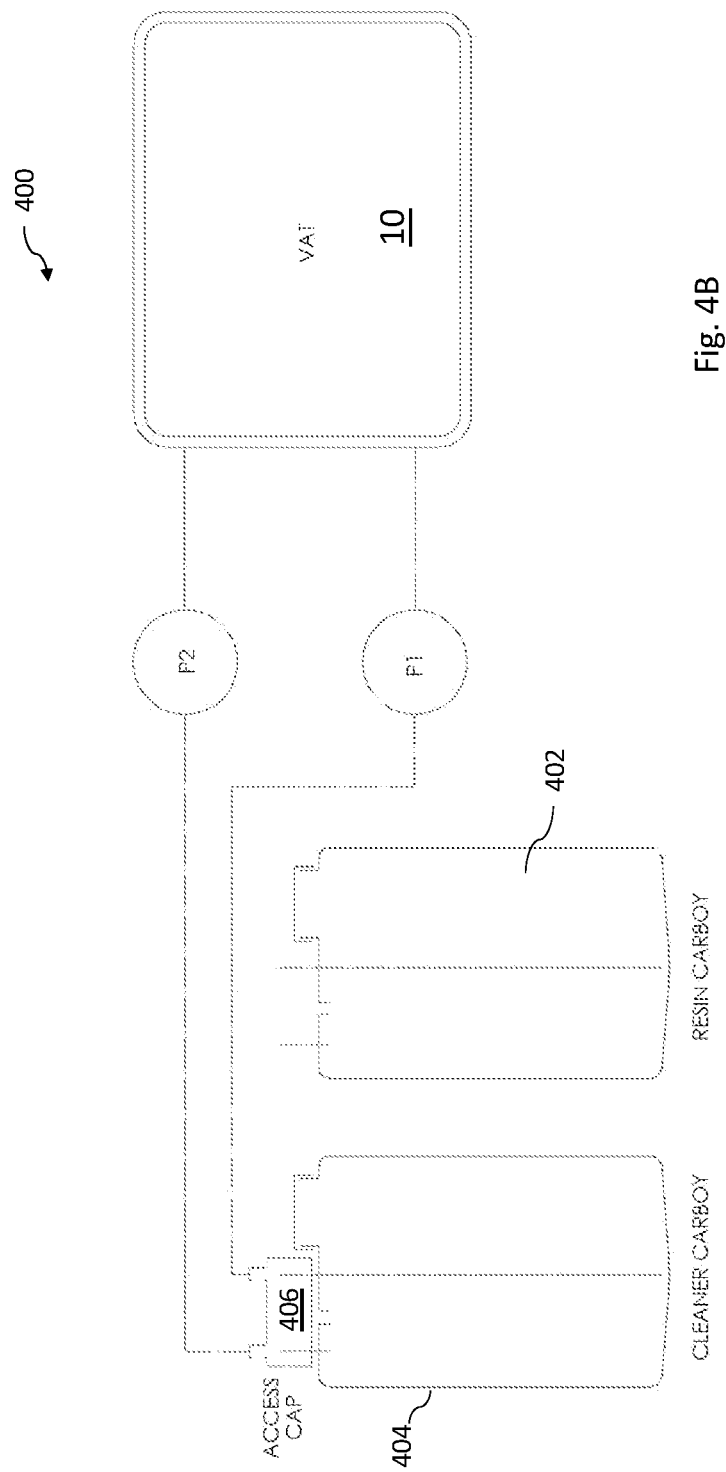

Referring now to FIGS. 4A and 4B, an alternative embodiment of a resin filling and evacuation arrangement 400 for the 3D printing system shown in FIG. 1 is illustrated. In this system, the vat 10 is selectively, fluidly coupled, via a pair of pumps P1 and P2 and one at a time, to a pair of carboys 402, 402. One of carboys, 402, is used as a resin store, while the other, 404, is used as a cleaner store. Any of a variety of cleaning solutions may be used, for example, isopropyl alcohol. Although not shown, the selective coupling of the carboys may be performed by a controller and appropriate valve arrangement, or it may be performed manually.

Carboys 402, 404 are similarly sized, e.g., 5 liters, and are selectively fitted with caps 406, 408, depending on the operation being performed. In FIG. 4A, a resin filling and recirculation state is illustrated, and so resin carboy 402 is fitted with access cap 406. Cleaner carboy 404 is fitted with storage cap 408. The access cap allows the carboy to which it is fitted to breath, while the storage cap blocks off the breathing holes in the carboy to which it is fitted. During resin filling and recirculating operations, the resin carboy 402 is allowed to breath, while the cleaner carboy 404 is kept sealed.

For resin filling and recirculation, the state depicted in FIG. 4A is adopted, with resin carboy 402 fluidly coupled to vat 10 via pumps P1 and P2. Cleaning carboy 404 may be stored off of the printer apparatus, or in a designated storage area thereon. To fill the vat 10 with resin, pump P1 is run in a forward direction and resin is pumped into the vat 10 from carboy 402 until a designated level in the vat is reached. During printing, resin is recirculated through the vat and carboy 402 by operating pump P1 to pump resin from the carboy 402 into the vat 10 and operating pump P2 to pump resin from the vat 10 into the carboy 402. Resin may be recirculated continually during printing or, as discussed above, when the temperature in the resin reaches or exceeds a threshold temperature (e.g. as monitored by a temperature sensor, not shown). Carboy 402 may be chilled or not. That is, active or passive cooling of carboy 402 may be employed. To empty the vat, pumps P1 and P2 are run so as to evacuate the vat and the associated tubing.

Referring to FIG. 4B, during cleaning system 400 is placed in the state illustrated in the drawing. That is, resin carboy 402 is decoupled from the vat and the cleaner carboy 404 is fluidly coupled to the vat via pumps P1 and P2. In this state, the resin carboy 402 may be kept open (as shown), or it may be fitted with the storage cap 408. The system may be cleaned by operating pump P1 to fill the vat 10 to a predetermined level with cleaning solution. Then, pump P2 may be operated to evacuate the vat 10 while pump P1 continues to pump cleaning solution into the vat. The cleaning solution may be circulated through the vat in this fashion for a predetermined time, or until the system is observed to be clean, and then the pumps P1 and P2 may be operated to fully evacuate the tank and tubing. Thereafter, the system may be reconfigured to the state shown in FIG. 4A for new printing operations to commence.

Thus, an additive manufacturing apparatus in which a photo-curable resin is cured through exposure to radiation when fabricating an object, and in particular to such an apparatus in which the photo-curable resin in a vat is periodically replaced according to its temperature has been described.

What is claimed is:

1. An additive manufacturing apparatus in which an object is formed in a tank by selective photo-curing of a liquid resin contained in the tank through exposure to radiation, said apparatus characterized in that the tank has one or more ports for an introduction and evacuation of the liquid resin under a control of one or more pumps, said one or more pumps fluidly coupling, during a printing operation and under a control of a controller, a resin-containing area of said tank to one or more sources of resin and resin storage, the apparatus further comprising a source of cleaning solution adapted to be selectively coupled to the tank via the one or more pumps during a cleaning operation, wherein the controller comprises a processor and a memory storing instructions that when executed by the processor cause the controller to:
   prior to the printing operation in the tank, pump the liquid resin from the one or more sources of resin and resin storage into the tank via a first port in the tank so as to fill the tank with the liquid resin to an operational level;
   perform the printing operation in the tank;
   detect a temperature of the liquid resin in the tank reaching or exceeding a threshold;
   in response to said detection, pause the printing operation, and pump the liquid resin in the tank to the resin storage so as to evacuate the tank; and
   pump new resin into the tank.

2. The additive manufacturing apparatus of claim 1, wherein the liquid resin in the tank is pumped to the resin storage from the first port.

3. The additive manufacturing apparatus of claim 1, wherein the liquid resin in the tank is pumped to the resin storage from a second port of the tank that is different from the first port.

4. The additive manufacturing apparatus of claim 1, wherein the instructions cause the controller to detect the temperature of the liquid resin while the printing operation in the tank is being performed.

5. The additive manufacturing apparatus of claim 1, further comprising a temperature sensor that is configured to detect the temperature of the liquid resin.

6. The additive manufacturing apparatus of claim 1, wherein the instructions cause the controller to partially evacuate the liquid resin from the tank in response to said detection.

7. The additive manufacturing apparatus of claim 1, wherein the instructions cause the controller to completely evacuate the liquid resin from the tank in response to said detection.

8. The additive manufacturing apparatus of claim 1, wherein the new resin that is pumped into the tank is chilled prior to being pumped into the tank.

9. The additive manufacturing apparatus of claim 1, wherein the new resin is pumped into the tank from the resin storage.

* * * * *